April 14, 1953 O. E. WAGENKNECHT 2,635,142

TELEVISION APPARATUS

Filed Feb. 8, 1951 3 Sheets-Sheet 1

INVENTOR.
OTTO E. WAGENKNECHT
BY Francis W. Crotty
HIS ATTORNEY

INVENTOR.
OTTO E. WAGENKNECHT
BY Francis W. Crotty
HIS ATTORNEY

April 14, 1953 O. E. WAGENKNECHT 2,635,142
TELEVISION APPARATUS
Filed Feb. 8, 1951 3 Sheets-Sheet 3

INVENTOR.
OTTO E. WAGENKNECHT
BY Francis W. Crotty
HIS ATTORNEY

Patented Apr. 14, 1953 2,635,142

UNITED STATES PATENT OFFICE

2,635,142

TELEVISION APPARATUS

Otto E. Wagenknecht, Chicago, Ill., assignor to Zenith Radio Corporation, a corporation of Illinois Application February 8, 1951, Serial No. 210,020

11 Claims. (Cl. 178—5.4)

Figure 1:
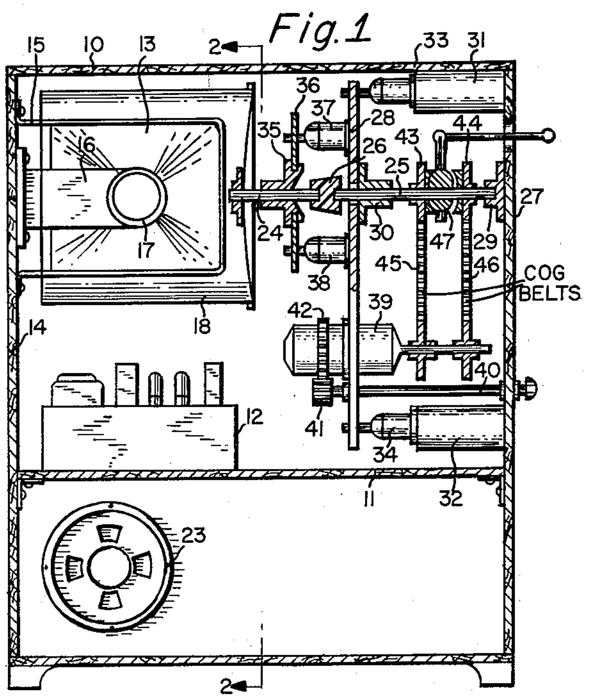

This invention relates to television apparatus for use in monochrome television systems having prescribed line and field frequency specifications, and at the same time, useful for color-television systems having scanning frequencies that may be the same as, or different from, those of the monochrome systems. More particularly, the invention relates to television apparatus which may utilize a monochrone television signal, and which may be quickly and conveniently conditioned to utilize a color-television signal having the same or distinctly different transmission standards.

In accordance with present-day standards, monochrome television signals are transmitted with scanning frequencies of 30 frames or 60 interlaced fields per second with 525 lines in each field. It has been proposed that the color-television signals transmitted in the field-sequential system have synchronizing frequencies comprising 24 frames or 48 interlaced color fields per second, each of the color fields representing one of three primary colors of the televised image. It is also proposed that each primary color field be composed of 405 lines.

Since it is contemplated that monochrome and color-television broadcasts will be concurrently available, it is most desirable to provide a commercially acceptable television receiver capable of utilizing the monochrome signals to produce black and white images, and also capable of using the color signals to produce images in natural color. Because of the possible use of different standards for the monochrome and color television signals, serious problems have arisen concerning the production of such a television receiver.

The present invention provides improved apparatus that may be constructed in a relatively simple and efficient manner to utilize television signals of various synchronizing-frequency composition in the reproduction of images in natural color or in black and white. The apparatus comprises a cathode-ray video-signal translating device, which includes a sensitized screen and means for scanning an electron beam developed within the device over an area of the screen in a series of fields of parallel lines. A color-filter drum, having a plurality of different color-filter segments disposed on the peripheral surface thereof and a plurality of clear segments interspersed with the color-filter segments, is rotatably supported so that it encircles at least a portion of the translating device with the segments traversing an optical path to the screen. A driving mechanism is provided for rotating the drum at such a speed that alternate segments of the drum traverse the scanned area of the screen in coincidence with successive field scansions thereof by the beam. The apparatus further includes means for adjusting the relative phase of the drum and the field scansions between a first condition, wherein the color-filter segments traverse the screen in coincidence with successive field scansions thereof for color reproduction, and a second condition wherein the clear segments traverse the area in coincidence with succeeding field scansions for black and white reproduction.

It is, accordingly, an object of this invention to provide improved television apparatus for use in color or monochrome television systems.

A further object of this invention is to provide improved television apparatus for use in a television system and capable of reproducing either black and white images or, when so desired, images in natural color.

Another object of this invention is to provide improved television apparatus which may utilize a monochrome television signal for the reproduction of black and white images, and which may further utilize a color-television signal for the reproduction of images in natural color.

Yet a further object of the invention is to provide improved television apparatus which may utilize a monochrome television signal of certain prescribed synchronizing standards for the reproduction of black and white images, and which may be conditioned in a simple and expedient fashion to utilize color-television signals of distinctly different synchronizing standards for the reproduction of images in natural color.

Figure 2:
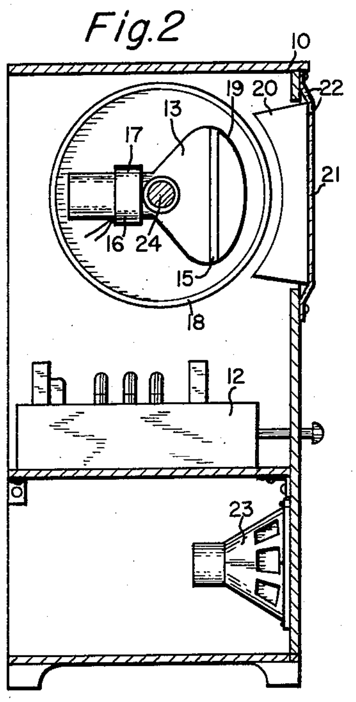
Figure 3:
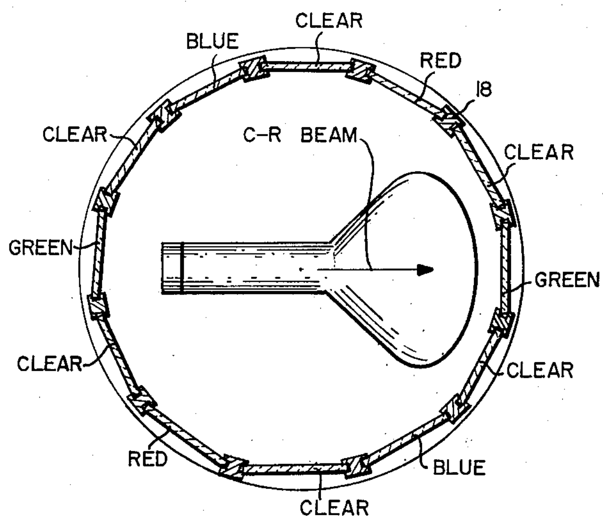
Figure 4:
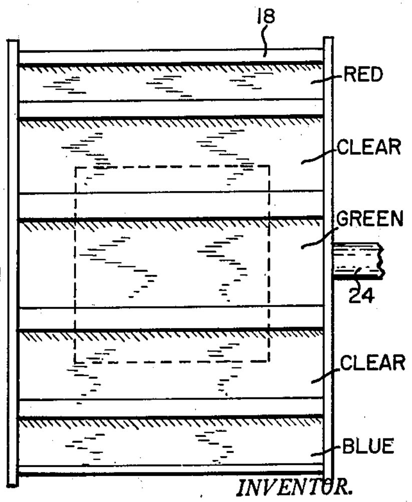
Figure 5:
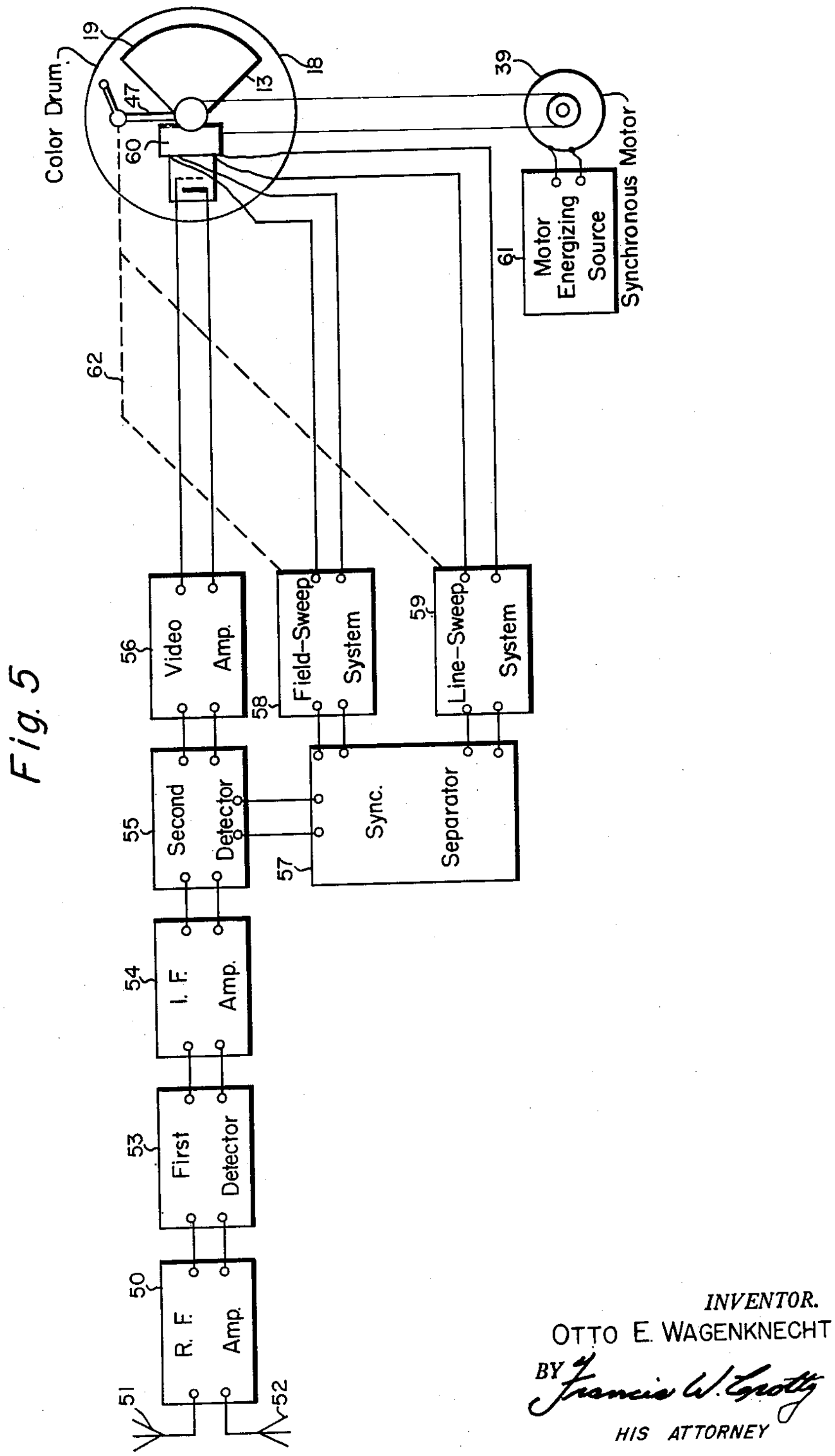
Figure 6:
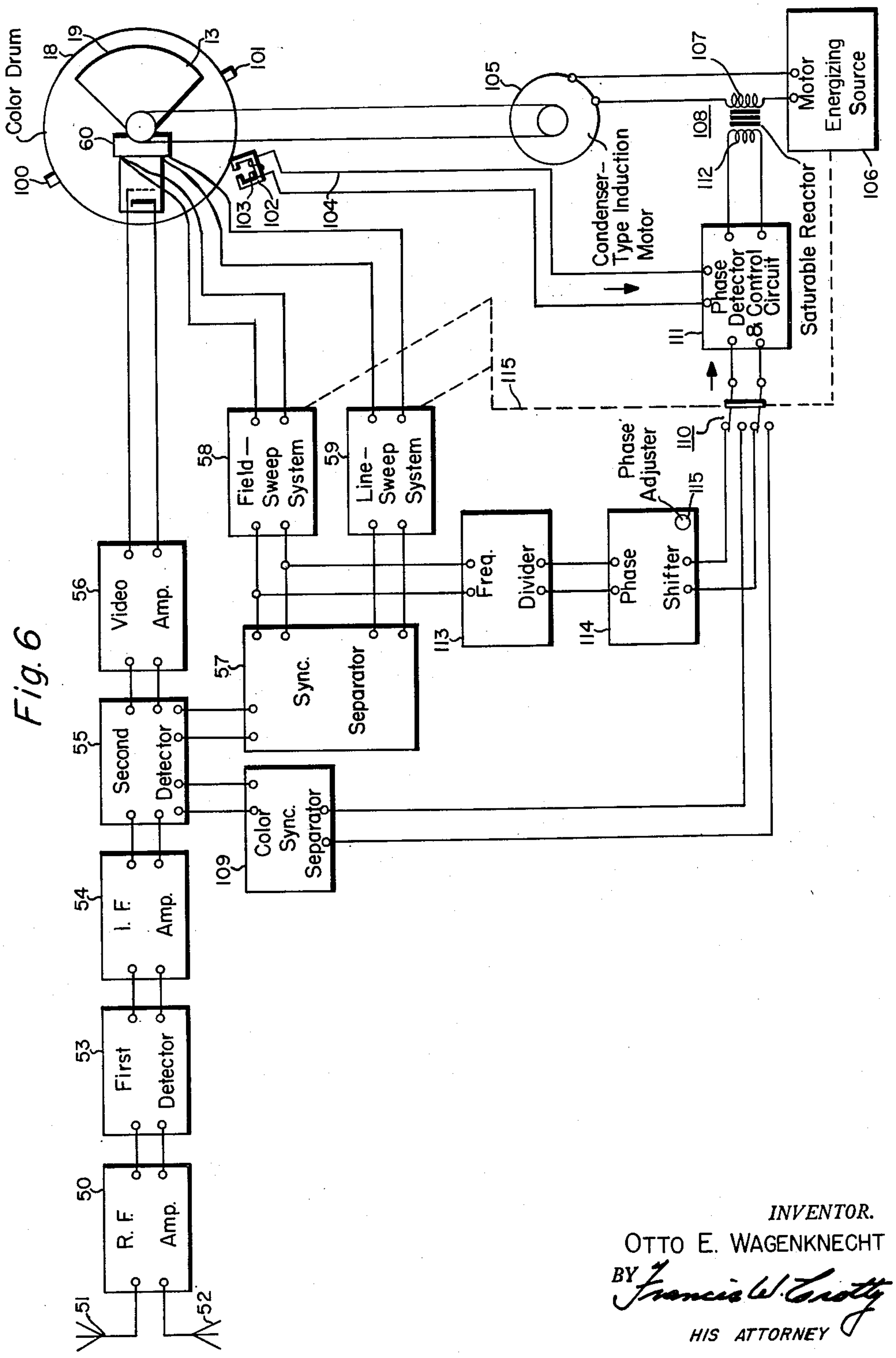

The features of this invention which are believed to be new are set forth with particularity in the appended claims. The invention itself, however, together with further objects and advantage thereof may best be understood by reference to the following description when taken in conjunction with the accompanying drawings, in which:

Figure 1 represents a rear view of a television receiver constructed in accordance with one embodiment of the invention, Figure 2 is a sectional view of the receiver taken along the lines 2—2 of Figure 1, Figures 3 and 4 are diagrams indicating an operating principle of the invention, Figure 5 is a block diagram of a television receiver utilizing the embodiment of the invention shown in Figures 1 and 2, and, Figure 6 is a block diagram of a television receiver utilizing a second embodiment of the invention.

The television receiver illustrated in Figures 1 and 2 comprises a cabinet 10 which includes a shelf 11 supporting the chassis 12 of the receiver. A cathode-ray video-signal translating device or image-reproducing tube 13 is supported from the side 14 of cabinet 10 by means of a strap 15 extending around the rim of the face of the tube, and by a bracket 16 enclosing a usual deflection yoke 17 mounted on the neck of the tube. Various electrical connections, not shown, extend from chassis 12 to reproducing tube 13.

A transparent drum 18 is rotatably supported within the cabinet, surrounding at least a portion of device 13. This drum has a plurality of different color filters disposed on the peripheral surface thereof and a plurality of clear segments interspersed with the color-filter segments, as described more fully hereinafter, and the drum is so supported that these segments traverse the optical path from the screen 19 of device 13 to an observer. A trim bezel 20 is provided to define the optical path to the observer, and a face plate 21 is supported on cabinet 10 adjacent the trim bezel by means of a bezel ring 22. A speaker 23 is mounted within the cabinet, as shown, and is electrically connected to the receiver chassis in well-known manner to reproduce the sound components of received television signals.

Drum 18 is supported on a shaft 24, which is coupled to a further shaft 25 through a flexible coupling 26. Shaft 25 is rotatably supported by means of bearings 29 and 30 between the side wall 27 of cabinet 10 and a plate 28. Plate 28 acts as a support for bearing 30 and is itself supported on a pair of blocks 31, 32 by means of shock mounts 33 and 34. Shaft 24 is supported by a bearing 35 secured to a plate 36 mounted on plate 28 by a pair of shock mounts 37, 38.

A synchronous motor 39 is rotatably supported by plate 28 and may be rotated by a shaft 40 coupled thereto through pinions 41, 42, which are affixed respectively to shaft 40 and to the casing of motor 39. A pulley wheel 43 of a preselected diameter and a pulley wheel 44 of another preselected diameter are rotatably mounted on shaft 25 and are driven by motor 39 through rubber cog belts 45, 46. The pulleys 43 and 44 may be selectively coupled to shaft 25 by a well-known cone clutch arrangement 47 having a member which is keyed to shaft 25 and displaceable therealong for selective engagement with the pulleys.

The arrangement of the color-filter and clear segments of drum 18 is best shown in Figures 3 and 4. It is assumed that the apparatus is to be used for color reproduction in a field-sequential color system utilizing the three primary colors red, blue and green. Each segment of the drum is arranged preferably to have a field dimension that is less than half the field dimension of the scanned area of the cathode-ray tube. In other words, the projected height of any segment on the face of the cathode-ray tube is less than one-half the screen height of the tube. The color-filter segments alternate with the clear segments, and are arranged in a repeating color sequence of green, red and blue. The several segments may be separated by narrow, transverse opaque surfaces to reduce reflection from the face of the drum. The drum may be composed of a transparent plastic having various segments colored with the primary colors and other segments left clear. Alternatively, the drum may comprise metallic framework with the various color-filter segments affixed thereto and with the intervening peripheral sections left open or the clear sections of the drum may be composed of an opaque mesh with a high percentage of open area.

To condition the receiver for the reception and utilization of a color-television signal having prescribed synchronizing frequencies, cone clutch 47 is shifted to engage shaft 25 with pulley 44. The diameter of pulley 44 is so chosen in relation to the speed of motor 39 and the field-scanning frequency of the received television signal that alternate segments of the drum traverse or pass in front of the scanned area of tube 13 in coincidence with successive field scansions thereof by the cathode-ray beam. Shaft 40 is rotated, if necessary, to adjust the phase relation of the drum relative to the field scansions of tube 15 so that succeeding color-filter segments traverse the scanned area in coincidence with succeeding field scansions thereof and with proper color phasing with respect to the sequentially received color fields of the color-television signal.

While there are a variety of speeds for the drum to effect image reproduction in natural color, a simple and illustrative example is as follows. Assume the phasing to be such that at the instant the electron beam is at the top of screen 19 at the start of its trace of a red-color field of the received signal, the mid-portion of a red color filter of the drum is aligned with the beam. If the peripheral drum speed is approximately equal to the field rate of the received signal, this relationship is maintained throughout the red-field scansion of the beam and the red color field is traced on the screen. At the completion of that field trace, the beam returns to its starting point at which time the succeeding blue color filter assumes the position which the red filter occupied at the start of the red field. This follows in view of the afore-described size of the drum segments and from the fact that a clear segment is interposed between the red and blue color filters. Consequently, during the next field trace in which the beam is modulated in accordance with the blue information of the received signal, a blue color field is traced on screen 19. In like manner, the third field scansion results in the tracing of a green color field on screen 19. So long as the field rate of the transmitted signal is sufficiently high, the eye of the observer integrates the several color fields of the image, giving the observer a sensation of image reproduction in natural color.

To condition the receiver for the reception and utilization of a monochrome television signal having different synchronizing standards from the color signal, cone clutch 47 is shifted to engage pulley 43 with shaft 25. The diameter of pulley 43 is so chosen that the drum is rotated at a speed related to the field-scanning frequency of the monochrome television signal so that alternate segments of the drum again traverse the scanned area of the screen in coincidence with successive field scansions thereof by the cathode-ray beam. For the reception of the monochrome signal, shaft 40 is rotated to adjust the phasing of the drum so that the clear segments cooperate with the electron beam as it scans screen 19 during successive field scansions to reproduce black and white images.

Cone clutch 47 is, preferably, coupled to an electrical switching mechanism so that actuation of the clutch not only alters the drum speed to correspond with the different synchronizing standards of the monochrome and color television signals, but also switches the receiver scanning system so that the line- and field-scanning rates of reproducing device 13 may be modified similarly to correspond with these different standards.

Therefore, by merely shifting cone clutch 47 to a first condition and adjusting shaft 40, the receiver may be conditioned to utilize a monochrome television signal and reproduce a black and white image. Alternately, by shifting the cone clutch to a second condition and adjusting shaft 40, the receiver may be conditioned to utilize a color-television signal and reproduce images in natural color. It is apparent that screen 19 must be composed of a fluorescent substance having a relatively short persistence of luminescence to avoid any carry-over from the color filters to the clear segments and vice versa.

The television receiver of Figure 5 comprises a radio-frequency amplifier 50 of one or more stages having input terminals connected to a suitable antenna circuit 51, 52 and output terminals connected to a first detector 53. First detector 53 is coupled to an intermediate-frequency amplifier 54 of any desired number of stages, and the output terminals of amplifier 54 are connected to a second detector 55. Second detector 55 is connected through a video amplifier 56, of one or more stages, to the input electrodes of cathode-ray image-reproducing tube 13. The sound portion of the receiver has not been shown because it constitutes no part of the present invention and it may be of any conventional construction.

Second detector 55 is further connected to a synchronizing-signal separator 57 which, in turn, is connected to a field-sweep system 58 and a line-sweep system 59. The systems are connected to a deflection yoke 60 associated with reproducing tube 13, and arranged to scan the electron beam thereof over an area of screen 19 in a series of fields of parallel lines. The sweep systems 58, 59 are so constructed that they may be switched between: (a) a first condition wherein they may be synchronized by a received monochrome television signal so that screen 19 is scanned by the beam at a line and field rate corresponding to the synchronizing standards of the monochrome signal; and (b) a second condition wherein the sweep systems may be synchronized by a received color-television signal so that the screen is scanned in accordance with the synchronizing standards of the color signal. Synchronous motor 39 is rotated at a preselected speed by means of a motor-energizing source 61.

Radio-frequency amplifier 50 may be tuned to amplify a monochrome television signal intercepted by antenna circuit 51, 52. This signal is heterodyned to the selected intermediate frequency of the receiver in first detector 53 and the resulting intermediate-frequency signal is amplified in intermediate-frequency amplifier 54. The amplified intermediate-frequency signal is detected in second detector 55 to produce a composite video signal. The video signal is amplified in amplifier 56 and applied to the input electrodes of reproducing device 13 to control the intensity of the cathode-ray beam developed therein in well-known manner.

The synchronizing components of the composite video signal are separated in synchronizing-signal separator 57 and used to control the operation of sweep systems 58, 59 which, in turn, control the field- and line-scansion of the cathode-ray beam in device 13. Cone clutch 47 is shifted so that drum 18 is rotated by motor 39 at a speed related to the field-scanning frequency of the monochrome signal so that alternate segments of the drum traverse the scanned area of the screen in coincidence with successive field scansions thereof by the cathode-ray beam. As previously stated, clutch 47 may be coupled, as shown by dotted lines 62 to switching devices in sweep systems 58, 59 to condition the sweep systems for synchronization in accordance with the synchronizing components of the monochrome signal when in its above-described condition. Synchronous motor 39 may be rotated by shaft 40 of Figure 1 to adjust the phase of the color drum so that the clear segments of the color drum traverse the scanned area of screen 19 in coincidence and alignment with the successive field scansions thereof so that the receiver reproduces a black and white image.

Alternatively, cone clutch 47 may be shifted to rotate color drum 18 at a speed corresponding to the field-scanning frequency of a received color-television signal, and sweep systems 58, 59 simultaneously conditioned for synchronization by its synchornizing components. Radio-frequency amplifier 50 may be tuned to amplify the received color-television signal and the receiver utilizes this signal in the same manner as it utilizes the monochrome signal. Synchronous motor 39 is rotated by shaft 40 of Figure 1 to adjust the phase of the color drum so that the color-filter segments traverse the scanned area of screen 19 in coincidence and alignment with successive field scansions thereof so that the receiver reproduces images in natural color.

The receiver of Figure 6 is similar to the aforedescribed receiver, except that the conditioning from black and white to color reception is performed electrically instead of mechanically. Stages of the receiver of Figure 6 which correspond to stages of the receiver of Figure 5 have been indicated by like numerals. As shown in Figure 3, color drum 18 is provided with two groups of red, green and blue color segments. When this drum is used in conjunction with the receiver of Figure 6, a soft iron projection 100 is mounted on the drum adjacent one of the red segments, and a soft iron projection 101 is mounted adjacent the other red segment. An iron core 102 having extremities which define an air gap is mounted adjacent the color drum so that projections 100, 101 pass through the air gap as the drum rotates. A coil 103 is wound about core 102 and connected to a phase detector and control circuit 111 by way of leads 104. An energizing source is included in the phase detector so that a current flows through coil 103. As the projections pass through the air gap of core 102, they vary the magnetic reluctance of the magnetic circuit of the core and cause pulses to be developed in leads 104. Due to the positioning of segments 100, 101 each pulse developed on leads 104 indicates the initiation of a traversal of screen 19 by one of the red segments.

In the receiver of Figure 6, synchronous motor 105 for driving the drum is a condenser type induction motor and is connected to a motor-energizing source 106 through a winding 107 of a saturable transformer 108. Second detector 55 is connected to a color synchronizing-signal separator 109 which, in turn, is connected through a double-pole double-throw switch 110 to phase detector and control unit 111. The output terminals of unit 111 are connected to a second winding 112 of saturable transformer 108. Synchronizing-signal separator 57 is connected to a frequency divider 113 and applies field synchronizing pulses thereto wherein they are divided at the rate of 3:1. The output terminals of frequency divider 113 are connected to a phase shifter 114, whose phase-shifting characteristic may be varied as shown by the phase-adjuster 115. The output terminals of phase shifter 114 are connected through switch 110 to unit 111. Switch 110 is coupled as shown by dotted lines 115 to switching devices in sweep systems 58, 59 so that when switch 110 connects separator 109 to unit 111 the sweep systems are conditioned for synchronization in accordance with the synchronizing components of a color-television signal; and when the switch is in a position to connect phase shifter 114 to unit 111, the sweep systems are in a condition for synchronization by the synchronizing components of a monochrome television signal.

To condition the receiver for the utilization of a color television signal intercepted by antenna circuit 51, 52, switch 110 is placed in a position to connect separator 109 to unit 111. Radio-frequency amplifier 50 is then tuned to the color-television signal and this signal is amplified and detected in the receiver in the afore-described manner to produce a composite video signal for controlling the intensity of the cathode-ray beam developed in reproducing tube 13, and to produce synchronizing signals for controlling the field and line scansions of the beam in accordance with the synchronizing frequencies of the color signal.

The color-television signal will be assumed to include a color-synchronizing component which precedes each sequence of red, green and blue color fields. The color-synchronizing components are derived in separator 109 and applied to phase detector and control unit 111. These components are compared in unit 11 with the pulses applied thereto over leads 104, and the unit develops a control current in winding 112 of saturable transformer 108. Variations in the control current cause corresponding variations in the saturation of the core of transformer 108 which, in turn, varies the impedance of winding 107 to control the speed of motor 105. Any alteration in phase between the pulses from separator 109 and the pulses from leads 104 causes an alteration in the control current indicative of such phase alteration. In this manner, the speed of motor 105 and, hence, the speed of color drum 18 may be synchronized with the color-television signal so that the segments of the drum traverse the scanned area of screen 19 at the same rate as the field scansion of a cathode-ray beam. Moreover, since each pulse from separator 108 indicates the initiation of a red-color field, and each pulse on leads 104 indicates the initiation of a traversal of screen 19 by a red segment, the drum is automatically phased so that the color filters traverse the screen in coincidence with corresponding color fields of the received signal, enabling the receiver to reproduce natural color images. The above-described control arrangement for synchronizing the phase and speed of a color disc or drum with a received color-television signal is well known, and further description thereof is deemed to be unnecessary.

To condition the receiver for the utilization of a monochrome television signal, switch 110 is placed in its upper position to connect phase shifter 114 to unit 111, and simultaneously to condition sweep systems 58, 59 for synchronization with the synchronizing components of the received monochrome signal. The television signal is amplified and detected by the receiver in the previously-described manner, its video components being utilized to control the intensity of the cathode-ray beam in device 13 and its synchronizing components being utilized to control the scansions of the beam.

The field-synchronizing components of the television signal are frequency divided in divider 113, and the divider produces a pulse indicating the initiation of every third field of the television signal. These pulses are passed through phase shifter 114 to phase detector 111 wherein they are compared with the pulses on leads 104. As previously described, the pulses on leads 104 occur during the initiation of each red segment of the color drum, that is, they occur once in every traversal of screen 19 by three clear segments. Therefore, the pulses compared in the phase detector of unit 111 represent respectively each group of three fields of the television signal and each group of three clear segments of drum 18. The comparison of these pulses produces a control current in winding 112 to adjust the speed of motor 105 so that the segments on drum 18 traverse screen 19 at the same rate as the field scansion of the screen by the cathode-ray beam. Phase adjustor 115 may be manipulated to effect a phase relation between the frequency-divided pulses applied to phase detector 111 and the fields of the received television signal such that the clear segments of drum 18 traverse screen 19 in coincidence with the field scansion thereof by the cathode-ray beam. This enables the receiver to reproduce black and white images.

The invention provides, therefore, improved television apparatus for use in color or monocrome systems. The apparatus is relaively simple and economical to construct and may be conditioned in an expedient manner to utilize a black and white television signal having certain prescribed synchronizing frequencies or a color-television signal having the same or different synchronizing frequencies.

While particular embodiments of the invention have been shown and described, modifications may be made and it is intended in the appended claims to cover all such modifications as fall within the true spirit and scope of the invention.

I claim:

1. Television apparatus comprising: a sensitized screen; means for developing an electron beam and for directing said beam to said screen; means for recurrently scanning said beam over an area of said screen in a series of fields of parallel lines; a color-filter drum having a plurality of different color-filter segments disposed on the peripheral surface thereof and a plurality of clear segments interspersed with said color filter segments; means for rotatably supporting said drum so that the segments traverse an optical path to the screen; a driving mechanism for rotating said drum at such a speed that alternate segments of said drum traverse said area of said screen in coincidence with successive field scansions thereof by said beam; and means for adjusting the relative phase of said drum and said field scansions between a first condition wherein said color-filter segments traverse said area in coincidence with successive field scansions thereof, and a second condition wherein said clear segments traverse said area in coincidence with successive field scansions thereof.

2. Television apparatus comprising: a cathode-ray video-signal translating device including a sensitized screen and means for scanning an electron beam developed therein over an area of said screen in a series of fields of parallel lines; a color-filter drum having a plurality of different color-filter segments disposed on the peripheral surface thereof and a plurality of clear segments interspersed with said color-filter segments; means for rotatably supporting said drum so that it encircles at least a portion of said device with said segments traversing an optical path to said screen; a driving mechanism for rotating said drum at such a speed that alternate segments of said drum traverse said area of said screen in coincidence with successive field scansions thereof by said beam; and means for adjusting the relative phase of said drum and said field scansions between a first condition wherein said color-filter segments traverse said area in coincidence with successive field scansions thereof, and a second condition wherein said clear segments traverse said area in coincidence with successive field scansions thereof.

3. Television apparatus comprising: a cathode-ray video-signal translating device including a sensitized screen and means for scanning an electron beam developed therein over an area of said screen in a series of fields of parallel lines; a color-filter drum having a plurality of different color-filter segments disposed on the peripheral surface thereof and a plurality of clear segments interspersed with said color-filter segments; means for rotatably supporting said drum so that it encircles at least a portion of said device with said segments traversing an optical path to said screen; a driving mechanism for rotating said drum at such a speed that alternate segments of said drum traverse said area of said screen in coincidence with successive field scansions thereof by said beam; and mechanical means coupled to said driving mechanism for adjusting the relative phase of said drum and said driving mechanism between a first condition wherein said color-filter segments traverse said area in coincidence with successive field scansions thereof, and a second condition wherein said clear segments traverse said area in coincidence with successive field scansions thereof.

4. Television apparatus comprising: a cathode-ray video-signal translating device including a sensitized screen and means for scanning an electron beam developed therein over an area of said screen in a series of fields of parallel lines; a color-filter drum having a plurality of different color-filter segments each having a field dimension not exceeding one-half the field dimension of said area of said screen disposed on the peripheral surface thereof, and a plurality of clear segments each having a field dimension substantially equal to the field dimension of each of said color segments and interspersed with said color-filter segments; means for rotatably supporting said drum so that it encircles at least a portion of said device with said segments traversing an optical path to said screen; a driving mechanism for rotating said drum at such a speed that alternate segments of said drum traverse said area of said screen in coincidence with successive field scansions thereof by said beam; and means for adjusting the relative phase of said drum and said field scansions between a first condition wherein said color-filter segments traverse said area in coincidence with successive field scansions thereof, and a second condition wherein said clear segments traverse said area in coincidence with successive field scansions thereof.

5. A television receiver comprising: a cathode-ray image-reproducing device including a fluorescent screen and elements for scanning an electron beam developed therein over an area of said screen in a series of fields of parallel lines; a scanning system coupled to said elements for effecting scansion of said beam over said area at a preselected field-scanning rate; a color-filter drum having a plurality of different color-filter segments disposed on the peripheral surface thereof and a plurality of clear segments interspersed with said color-filter segments; means for rotatably supporting said drum so that it encircles at least a portion of said device with said segments traversing an optical path from said screen; a driving mechanism for rotating said drum; a speed-control device coupled to said driving mechanism to synchronize the rotation of said drum with said preselected field-scanning rate so that alternate segments of said drum traverse said area of said screen in coincidence with successive field scansions thereof by said beam; and means for adjusting the relative phase of said drum and said field scansions between a first condition wherein said color-filter segments traverse said area in coincidence with successive field scansions thereof, and a second condition wherein said clear segments traverse said area in coincidence with successive field scansions thereof.

6. A television receiver comprising: a cathode-ray image-reproducing device including a fluorescent screen and elements for scanning an electron beam developed therein over an area of said screen in a series of fields of parallel lines; a scanning system coupled to said elements for selectively effecting scansion of said beam over said area at a plurality of predetermined field-scanning rates; a color-filter drum having a plurality of different color-filter segments disposed on the peripheral surface thereof and a plurality of clear segments interspersed with said color-filter segments; means for rotatably supporting said drum so that it encircles at least a portion of said device with said segments traversing an optical path from said screen; a driving mechanism for rotating said drum; a speed-control device coupled to said driving mechanism for selectively adjusting the rotation of said drum between a plurality of predetermined speeds corresponding respectively to said plurality of field-scanning rates so that alternate segments of said drum traverse said area of said screen in coincidence with successive field scansions thereof by said beam; and means for adjusting the relative phase of said drum and said field scansions between a first condition wherein said color-filter segments traverse said area in coincidence with successive field scansions thereof, and a second condition wherein said clear segments traverse said area in coincidence with successive field scansions thereof.

7. A television receiver comprising: a cathode-ray image-reproducing device including a fluorescent screen and elements for scanning an electron beam developed therein over an area of said screen in a series of fields of parallel lines; a scanning system coupled to said elements for selectively effecting scansion of said beam over said area at first and second field-scanning rates; a color-filter drum having a plurality of different color-filter segments disposed on the peripheral surface thereof and a plurality of clear segments interspersed with said color-filter segments; means for rotatably supporting said drum so that it encircles at least a portion of said device with said segments traversing an optical path from said screen; a driving mechanism for rotating said drum; a speed-control device coupled to said driving mechanism for selectively adjusting the rotation of said drum between a pair of predetermined speeds corresponding respectively to said first and second field-scanning rates so that alternate segments of said drum traverse said area of said screen in coincidence with successive field scansions thereof by said beam; and means for adjusting the relative phase of said drum and said field scansion between a first condition wherein said color-filter segments traverse said area in coincidence with successive field scansions thereof, and a second condition wherein said clear segments traverse said area in coincidence with successive field scansions thereof.

8. A television receiver comprising: a cathode-ray image-reproducing device including a fluorescent screen and elements for scanning an electron beam developed therein over an area of said screen in a series of fields of parallel lines; a scanning system coupled to said elements for selectively effecting scansion of said beam over said area at first and second-field scanning rates; a color-filter drum having a plurality of different color-filter segments disposed on the peripheral surface thereof and a plurality of clear segments interspersed with said color filter segments; means for rotatably supporting said drum so that it encircles at least a portion of said device with said segments traversing an optical path from said screen; a driving motor; a pair of belt drives extending from said motor to said drum for rotating said drum at speeds corresponding respectively to said first and second field-scanning rates; a clutch mechanism for selectively coupling said belt drives to said drum so that alternate segments of said drum traverse said area of said screen in coincidence with successive field scansions thereof by said beam; and means for adjusting the relative phase of said drum and said field scansion between a first condition wherein said color-filter segments traverse said area in coincidence with successive field scansions thereof, and a second condition wherein said clear segments traverse said area in concidence with successive field scansions thereof.

9. A television receiver comprising: a cathode-ray image-reproducing device including a fluorescent screen and elements for scanning an electron beam developed therein over an area of said screen in a series of fields of parallel lines; a scanning system coupled to said elements for selectively effecting scansion of said beam over said area at first and second field-scanning rates; a color filter drum having a plurality of different color filter segments disposed on the peripheral surface thereof and a plurality of clear segments interspersed with said color filter segments; means for rotatably supporting said drum so that it encircles at least a portion of said device with said segments traversing an optical path from said screen; a driving mechanism for rotating said drum; a speed-control device coupled to said driving mechanism for selectively adjusting the rotation of said drum between a pair of predetermined speeds corresponding respectively to said first and second field-scanning rates so that alternate segments of said drum traverse said area of said screen in coincidence with successive field scansions thereof by said beam; and means for controlling the relative phase of said drum and said field scansions so that said color-filter segments traverse said area in coincidence with successive field scansions thereof at said first field-scanning rate while said clear segments traverse said area in coincidence with successive field scansions thereof at said second field scanning rate.

10. A television receiver comprising: a cathode-ray image-reproducing device including a fluorescent screen and elements for scanning an electron beam developed therein over an area of said screen in a series of fields of parallel lines; a scanning system coupled to said elements for selectively effecting scansion of said beam over said area at first and second field-scanning rates; a color filter drum having a plurality of different color filter segments disposed on the peripheral surface thereof and a plurality of clear segments interspersed with said color filter segments; means for rotatably supporting said drum so that it encircles at least a portion of said device with said segments traversing an optical path from said screen; a driving mechanism for rotating said drum; a speed-control device coupled to said driving mechanism for selectively adjusting the rotation of said drum between a pair of predetermined speeds corresponding respectively to said first and second field-scanning rates so that alternate segments of said drum traverse said area of said screen in coincidence with successive field scansions thereof by said beam; and mechanical means coupled to said driving mechanism for adjusting the relative phase of said drum and said driving mechanism between a first condition wherein said color filter segments traverse said area in coincidence with successive field scansions thereof, and a second condition wherein said clear segments traverse said area in coincidence with successive field scansions thereof.

11. A television receiver comprising: a cathode-ray image-reproducing device including a fluorescent screen and elements for scanning an electron beam developed therein over an area of said screen in a series of fields of parallel lines; a scanning system coupled to said elements for selectively effecting scansion of said beam over said area at a plurality of predetermined field-scanning rates; a color-filter drum having a plurality of different color-filter segments disposed on the peripheral surface thereof and a plurality of clear segments interspersed with said color-filter segments; means for rotatably supporting said drum so that it encircles at least a portion of said device with said segments traversing an optical path from said screen; a driving mechanism for rotating said drum; a speed-control device coupled to said driving mechanism and to said scanning system for selectively adjusting the rotation of said drum between a plurality of predetermined speeds and for simultaneously selectively adjusting said scanning system to said plurality of field-scanning rates, so that alternate segments of said drum traverse said area of said screen in coincidence with successive field scansions thereof by said beam; and means for adjusting the relative phase of said drum and said field scansions between a first condition wherein said color-filter segments traverse said area in coincidence with successive field-scansions thereof, and a second condition wherein said clear segments traverse said area in coincidence with successive field scansions thereof.

OTTO E. WAGENKNECHT.

References Cited in the file of this patent

UNITED STATES PATENTS

| Number | Name | Date |
|---|---|---|
| 2,335,864 | Long | Dec. 7, 1943 |
| 2,416,918 | Goldsmith | Mar. 4, 1947 |